US008412930B2

(12) United States Patent
Gbadegesin et al.

(10) Patent No.: US 8,412,930 B2
(45) Date of Patent: Apr. 2, 2013

(54) DEVICE AUTHENTICATION WITHIN DEPLOYABLE COMPUTING ENVIRONMENT

(75) Inventors: Abolade Gbadegesin, Seattle, WA (US); Dharma K. Shukla, Sammamish, WA (US); Thomas A. Galvin, Amherst, NH (US); David R. Reed, Redmond, WA (US); Nikolay Smolyanskiy, Seattle, WA (US); Eric Fleischman, Redmond, WA (US); Roman Batoukov, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 928 days.

(21) Appl. No.: 12/248,137

(22) Filed: Oct. 9, 2008

(65) Prior Publication Data

US 2010/0093310 A1 Apr. 15, 2010

(51) Int. Cl.
*H04L 29/06* (2006.01)
(52) U.S. Cl. ..................................... 713/159
(58) Field of Classification Search .................. None
See application file for complete search history.

(56) References Cited

U.S. PATENT DOCUMENTS

| 5,987,134 | A * | 11/1999 | Shin et al. ............... 713/159 |
| 7,233,664 | B2 | 6/2007 | Soliman |
| 7,350,074 | B2 | 3/2008 | Gupta et al. |
| 7,398,327 | B2 | 7/2008 | Lee |
| 2005/0239445 | A1 | 10/2005 | Karaoguz et al. |
| 2006/0242639 | A1 | 10/2006 | Manion et al. |
| 2007/0067349 | A1 | 3/2007 | Jhaveri et al. |
| 2008/0076572 | A1 * | 3/2008 | Nguyen et al. ............... 463/42 |
| 2008/0109448 | A1 | 5/2008 | Aboel-Nil et al. |

FOREIGN PATENT DOCUMENTS

WO 2007113836 A2 10/2007

OTHER PUBLICATIONS

Vishnumurthy, et al. "KARMA: A Secure Economic Framework for Peer-to-Peer Resource Sharing", Retrieved at <<http://www2.sims.berkeley.edu/research/conferences/p2pecon/papers/s5-vishnumurthy.pdf>>, pp. 1-6, Jun. 2003.
"Understanding Windows Live Delegated Authentication", Retrieved at <<http://msdn.microsoft.com/en-us/library/cc287613.aspx>>, Feb. 2008, pp. 1-8.
Mizani, Hamid Reza, "A Prototype for Certificate Based Authentication in Peer-to-Peer Systems", Retrieved at <<http://web.it.kth.se/~rassul/exjobb/rapporter/hamidr.pdf>>, Oct. 2005, Stockholm, pp. 1-52.

* cited by examiner

*Primary Examiner* — Brandon Hoffman
(74) *Attorney, Agent, or Firm* — Microsoft Corporation

(57) ABSTRACT

A deployable computing environment may facilitate interaction and data sharing between users and devices. Users, devices, and relationships between the users and devices may be represented within the deployable computing environment. A relationship between a user and a device may specify that the device is owned by the user and that the device is authorized to perform operations within the deployable computing environment on behalf of the user. Secure authentication of devices and users for interaction within the deployable computing environment is achieved by authenticating tickets corresponding to the user, the device, and the relationship. A device identification ticket and a user identification ticket are used to authenticate the device and user for interaction within the deployable computing environment. A device claim ticket allows the device to perform delegated operations (e.g., data synchronization, peer connectivity, etc.) on behalf of the user without the user's credentials (e.g., user identification ticket).

20 Claims, 12 Drawing Sheets

DEVICE AUTHENTICATION WITHIN DEPLOYABLE COMPUTING ENVIRONMENT

BACKGROUND

Many users utilize information through multiple computing devices. It is advantageous to synchronize the data between the computing devices because some of the information may be relevant to one or more computing devices the user owns. Users may also synchronize data between computing devices owned by other users. One approach to facilitate synchronization between devices and users is to host a distributed computing environment that users and devices may use to access other devices and their data. Authentication becomes a significant consideration where multiple users with multiple devices are sharing information with other users and devices.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

As more users share and synchronize data between their devices and other user's devices, a secure technique for authenticating users and their devices in desirable. A deployable computing environment may be used to facilitate interacting with shared data of multiple users and devices. Many devices (e.g., cell phone, PDA, etc.) may be configured to share and synchronize data through the deployable computing environment. It is inefficient for a user to authenticate a device every time the device connects to and performs operations within the deployable computing environment. It would be advantageous to have the owner specify within the deployable computing environment a relationship that the owner owns the device and has delegated operations that the device may perform on behalf of the owner.

An alternative technique for authorizing and representing users, devices, and relationships between users and devices within a deployable computing environment is provided herein. A user may be authenticated to perform user operations within the deployable computing environment by sending a user identification ticket corresponding to the representation of the user within the deployable computing environment. The device may be authenticated to perform device operations within the deployable computing environment by sending a device identification ticket corresponding to the representation of the device within the deployable computing environment. The device may also be authenticated to perform additional operations (e.g., authorized user operations) on behalf of the user by sending a device claim ticket corresponding to the representation of the relationship between the device and the user within the deployable computing environment.

This technique provides a way to securely represent, register, and authenticate users and devices. Secure relationships between authenticated users and devices may be established and/or revoked. This enables peer connectivity, data synchronization, digital media licensing, etc. Within the relationship, a user may securely delegate operations that a device may perform on behalf of the user.

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

DETAILED DESCRIPTION

Figure 1:
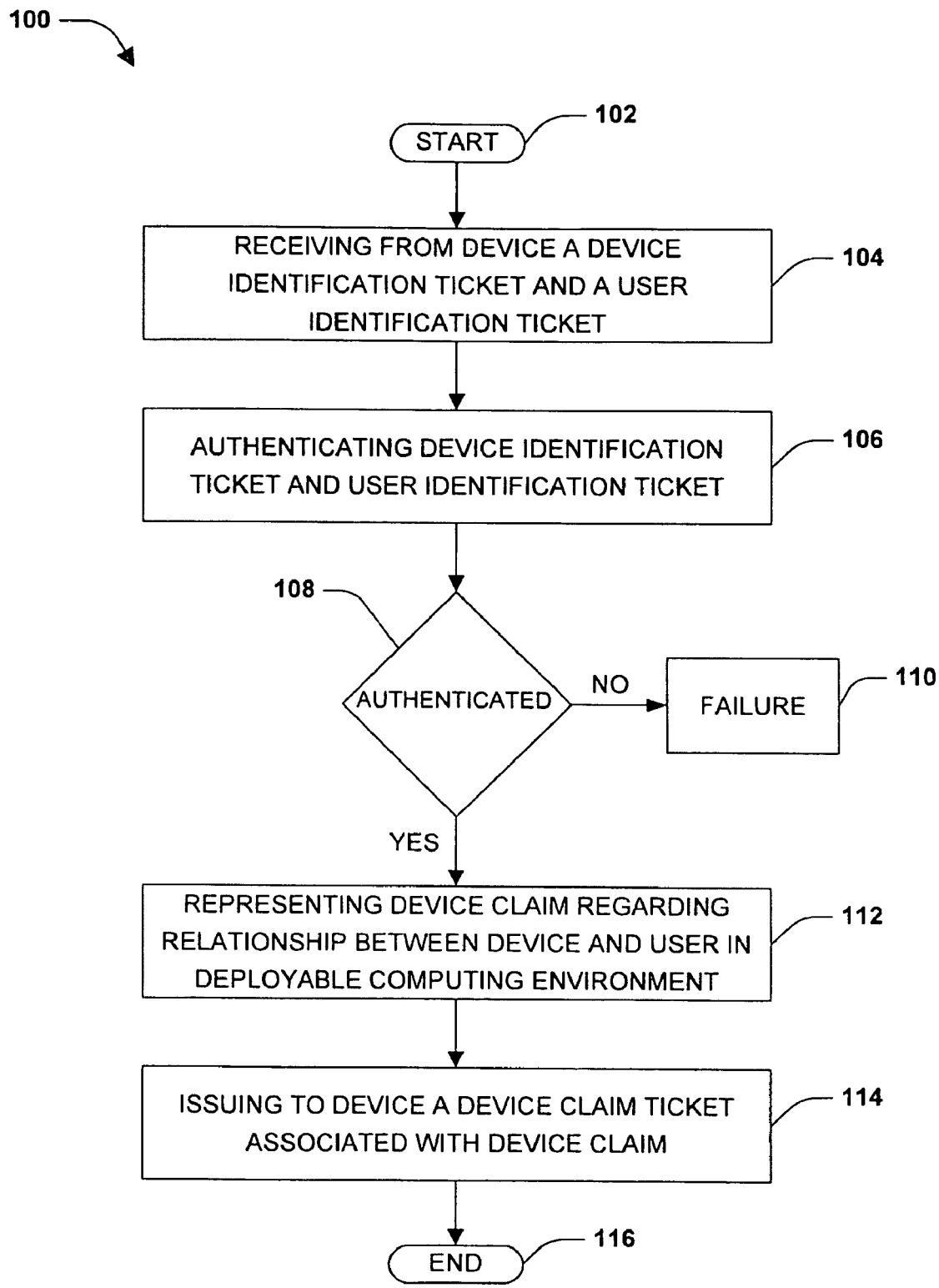
FIG. 1 is a flow chart illustrating an exemplary method of representing a relationship between a device and a user claiming the device in a deployable computing environment.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, structures and devices are illustrated in block diagram form in order to facilitate describing the claimed subject matter.

A deployable computing environment may be used to facilitate data storage and synchronization between users and devices. A user or device may be able to store data as a resource within the deployable computing environment. The data may reside within the deployable computing environment as a user resource or an object (e.g., a core object) mapping to a device comprising the data. The user or device may subscribe to resources owned by the device, the user, and/or other devices and other users. A secure environment through authenticating users and devices is beneficial because multiple users and devices may subscribe and perform operations upon the shared data.

To facilitate authenticating a user, a representation of the user may be created when the user first joins the deployable computing environment. Upon a request to join from the user, the credentials of the user (e.g., a user identification token) may be used to authenticate the user. Upon authenticating the user, an identity resource may be created within the deployable computing environment to represent the user. A user identification ticket is sent to the user for future authorization to interact within the deployable computing environment.

The user may register a device within the deployable computing environment. The user may send a request to create a representation of the device within the deployable computing environment. The request may comprise the user identification ticket and other information regarding the device and/or user. Upon authenticating the user identification ticket, a device resource may be created within the deployable computing environment to represent the device. A device identification ticket is sent to the device for future authorization to interact within the deployable computing environment. The device may use the device identification ticket to perform operations that the device is authorized to perform (e.g., authorized device operations which may be limited compared to authorized user operations).

The device may be able to perform operations within the deployable computing environment on behalf of the user. Because the device can perform limited operations within the deployable computing environment with its own credentials, a relationship may be established between the device and the user to delegate additional operations that may be performed on behalf of the user. The user may claim the device by sending a request for a representation of the relationship between the user and the device to be created within the deployable computing environment. The request may comprises a user identification ticket and a device identification ticket that may be used to authenticate the user and the device. Upon authenticating the user identification ticket and the device identification ticket, a device claim resource may be created to represent the relationship between the user and the device that is claimed. A device claim ticket is sent to the device for future authorization to perform operations on behalf of the user. Within the device resource claim, the user may delegate operations that the device may perform on the user's behalf.

The user has the ability to revoke the device. Upon a request to revoke the device, the corresponding device claim resource may be terminated within the deployable computing environment. The device will be unable to renew the device claim ticket after expiration. Device claim tickets, user identification tickets, and/or device identification tickets may have a time to live value (e.g., 8 hours). Once the time to live expires, the user and/or device may request a new ticket for authentication to access the deployable computing environment.

In one example of authenticating tickets, a user identification ticket may be used to securely identify the bearer as an authenticated user of a resource within a deployable computing environment. A device identification ticket may be used to securely identify the bearer as a device that may interact with resources within the deployable computing environment. A device claim ticket may be used to securely assert the existence of a relationship between the user and the device. The user, while physically present on the device, may present the user identification ticket and the device identification ticket for establishing a relationship between the device and the user. Once the relationship has been established thereby, the user may present the user identification ticket and the device claim ticket (e.g., a device authorization token) for proving a relationship between the device and the user. The device may similarly present the device identification ticket and the device claim ticket for proving a relationship between the device and the user.

It may be appreciated that when a device requests a device claim ticket, a link to the device claim ticket may be comprised within a device claim resource (e.g., a representation in the deployable computing environment of the relationship of the device and the user). The device may download the device claim ticket through a fetch operation from a specified URL.

In another example, a first device may request authentication for peer to peer connectivity. A device to device authorization token may be used to securely determine a relationship exists between the first authenticated device and a second authenticated device. The first authenticated device and/or the second authenticated device may send a device identification ticket and a device to device authorization token for proving that a relationship between the first authenticated device and the second authenticated device exists and peer to peer connectivity is permissible.

Four common authentication scenarios may arise. In the first scenario, the user may send the user identification ticket for authorization to perform user operations within the deployable computing environment. A user operation may comprise creating a relationship between a device and the user; modifying user properties; modifying a user resource associated with the user within the deployable computing environment; creating a user resource; deleting a user resource; and/or other operations related to the user.

In the second scenario, the device may send the device identification ticket for authorization to perform device operations within the deployable computing environment. A device operation may comprise synchronizing with a user resource; subscribing to a resource notification for a user resource; receiving update notifications allocated for the device, and/or other operations related to the device.

In the third scenario, the device may send the device identification ticket for authentication and a device claim ticket for authorization to perform user operations on behalf of the user. The device identification ticket is used to authorize the device to interact within the deployable computing environment. The device claim ticket allows the device to perform operations on behalf of the user. For example, once the device is authenticated (authorized through the device identification ticket), the device may discover other devices the user owns. If user has delegated permission for the device to perform operations related to the other devices, then the device may performs operations on behalf of the user, such as subscribing to resources owned by the other device. In another example, the device may request a peer to peer connection with a device the user has delegated permission to interact with.

In a fourth scenario, the user may send a user identification ticket and a device claim ticket for authorization for the user to perform tasks involving the device (e.g., authorized device operations). For example, the user may be authorized to establish a remote UI session to the device. In another example, the user may remotely instruct the device to begin synchronization with a new set of content within the deployable computing environment (e.g., a new user resource). This allows the user to present the device claim ticket for authorization (e.g., to prove a relationship exists between the user and the device) to perform operations related to or on behalf of the device.

It may be appreciated that many other scenarios may occur related to authentication of users and devices.

It may be appreciated that an authentication agent or authorization agent (e.g., an authenticator) may authenticate a device, a user, and/or a relationship by comparing data within a ticket to data stored within a representation of the corresponding device, user, and/or relationship in a deployable computing environment.

One embodiment of representing a relationship between a device and a user claiming the device in a deployable computing environment is illustrated by an exemplary method 100 in FIG. 1. At 102, the method begins. At 104, a device identification ticket and a user identification ticket are received from a device. The device identification ticket is used to authenticate the device within the deployable computing environment. The user identification ticket is used to authenticate the user within the deployable computing environment.

At 106, the device identification ticket and the user identification ticket are authenticated. If the device identification ticket has expired, then the device may request a new device identification ticket corresponding to the device. If the user identification ticket has expired, then the user may request a new user identification ticket by sending a token for authentication. If the user identification ticket and/or the device identification ticket are not authenticated, then a failure message may be returned to the device and/or user, at 110. At 108, the device identification ticket and the user identification ticket are authenticated to access the deployable computing environment. At 112, a device claim (e.g., a device claim resource 302 in FIG. 3) regarding a relationship between the device and the user may be represented within the deployable computing environment. The device claim may be created in response to the user requesting that the device is to be claimed by the user.

The device claim represents the relationship between the device and the user claiming the device. The device claim may specify that the user owns the device and the user has delegated rights to the device to perform operations on behalf of the user that the device would otherwise not be permitted to perform without user credentials. For example, the user may delegate permission for the device to synchronize data, access other devices the client owns, enumerate user resources, etc.

At 114, a device claim ticket associated with the device claim is issued to the device. The device claim ticket may be used by the device to perform operations within the deployable computing environment on behalf of the user. For example, the device may perform authorized user operations. Authorized user operations may comprise enumerating user resources; modifying user properties; modifying a user resource (e.g., data owned by the user) associated with the user within the deployable computing environment; mapping or updating a resource in the deployable computing environment; subscribing to another resource residing on another device owned by the user; and/or other user operations that may be performed within a deployable computing environment.

For the device to connect to the deployable computing environment to perform operations on behalf of the user, the device may send a device identification ticket along with the device claim ticket. The device is authenticated through the device identification ticket. Once the device is authenticated, the device claim ticket provides the permission to perform operations on behalf of the user. The device claim ticket, device identification ticket, and/or the user identification ticket may comprise a ticket validity period (e.g., a time to live value). For example, a ticket may expire within 8 hours (corresponding to a typical business day). After the ticket expires, the user and/or device may request a new ticket used for authentication within the deployable computing environment. At 116, the method ends.

Figure 2:
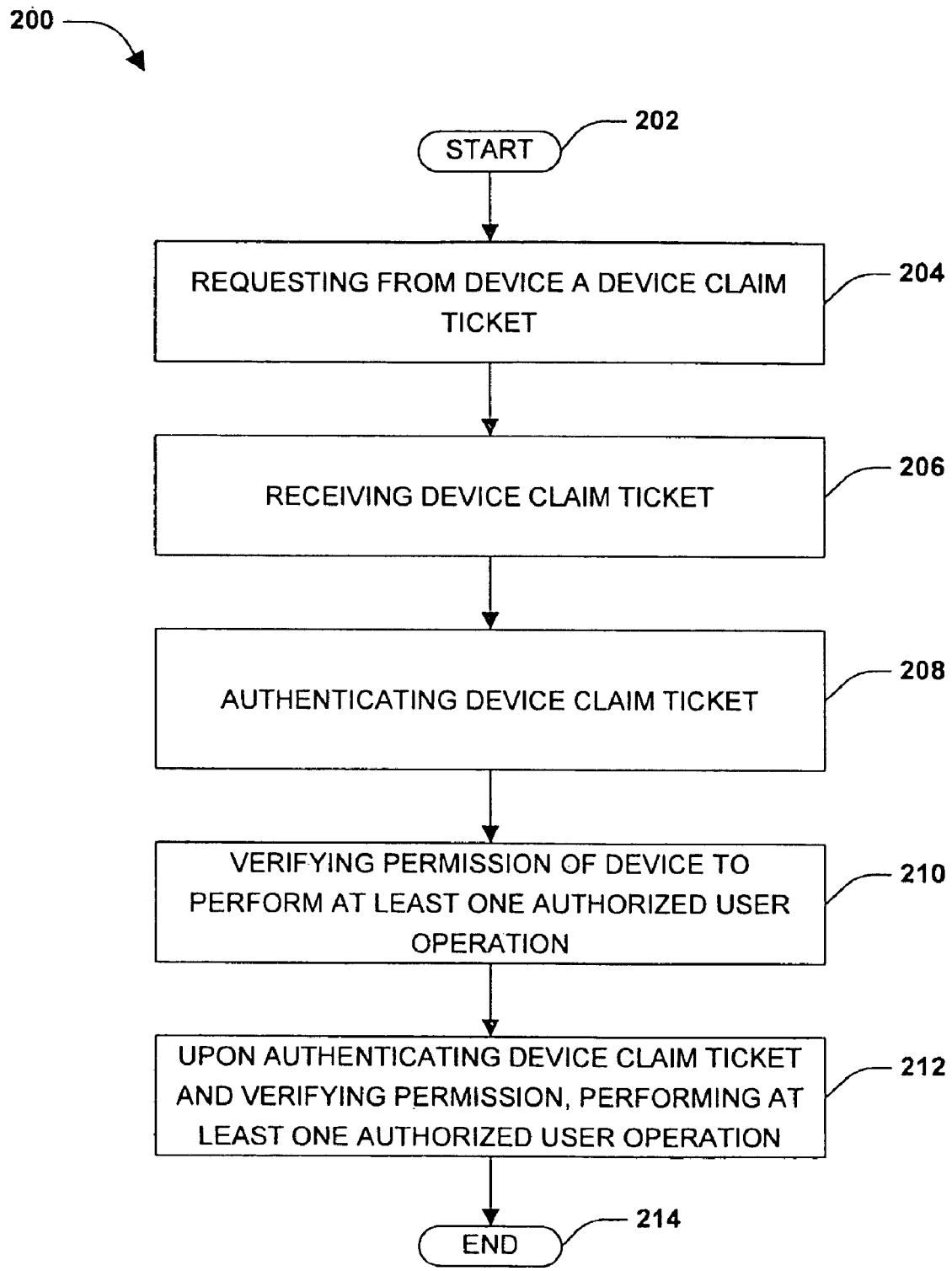
FIG. 2 is a flow chart illustrating an exemplary method of authenticating at least one operation by a device in a deployable computing environment.

One embodiment of authenticating at least one operation by a device in a deployable computing environment is illustrated by an exemplary method 200 in FIG. 2. At 202, the method begins. At 204, a device claim ticket is requested from the device. At 206, the device claim ticket is received. At 208, the device claim ticket is authenticated. The device claim ticket may be authenticated by determining whether a representation of a relationship (e.g., a device claim resource) exists between the device and a user (e.g., a use that owns the device and has delegated operations the device may perform on behalf of the device).

It may be appreciated that a device identification ticket may be requested for authentication for the device to interact within the deployable computing environment. Once the device identification ticket is authenticated (e.g., the device is authorized to access the deployable computing environment), the device claim ticket may be used to determine what operations the device may perform within the deployable computing environment on behalf of the user.

At 210, permission of the device to perform at least one authorized user operation is verified. For example, a device claim resource may specify the operations that the device may perform. At 212, upon authenticating the device claim ticket and verifying permission, at least one authorized user operation is performed. At 214, the method ends.

Figure 3:
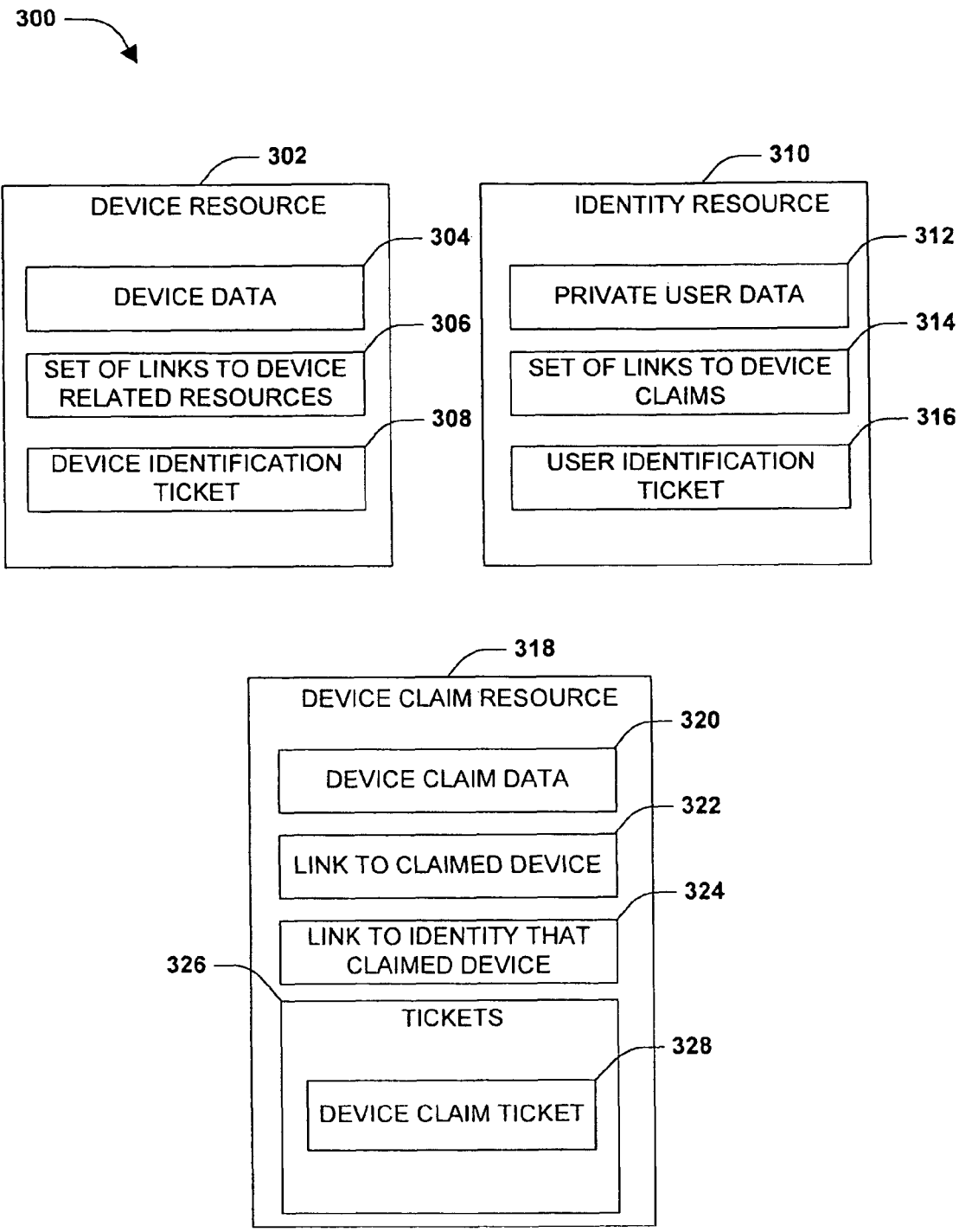
FIG. 3 is an illustration of an example of representing a device, a user, and a relationship between the device and the user within a deployable computing environment.

FIG. 3 illustrates an example 300 of a representation of a device, a user, and a relationship between the device and the user within a deployable computing environment. A request may be received from a user to register within the deployable computing environment. Identification information (e.g., an authentication token) may be requested from the user for authentication of the user within the deployable computing environment. Upon receiving the identification information and authenticating the user, an identification resource 310 may be created to represent the user within the deployable computing environment.

The identity resource 310 may comprise a private user data 312 (e.g., user configuration settings, mappings to user resources owned by the user, a set of devices owned by the user, etc.). The identity resource may comprise a set of links to device claims 314 (e.g., a mapping to device claims representing the relationship between the user and device the user claimed and delegated rights to). The identity resource 310 may comprise a user identification ticket 316, which may be used to identify and authenticate a user identification ticket sent by the user. The user identification ticket 316 may authorize the user to interact within the deployable computing environment.

A request may be received from a device to register within the deployable computing environment. If the device is authorized to register itself, a device resource 302 may be created to represent the device within the deployable computing environment.

The device resource 302 may comprise a device data 304 (e.g., device configuration settings). The device resource 302 may comprise a set of links to device related resources 306 (e.g., a set of resources the device is subscribed to receive notifications about; a second device the device may synchronize with, etc.). The device may comprise a device identification ticket 308. The device identification ticket may be used for authentication of a device identification ticket sent by the device for authorization to interact within the deployable computing environment.

A request may be received from a user to claim a device. A user identification ticket and a device identification ticket may be received to authenticate the user and/or device to interact within the deployable computing environment. Upon authentication of the user identification ticket and the device identification ticket, a device claim resource 318 may be created within the deployable computing environment. The device claim resource 318 represents the relationship between the user and the device within the deployable computing environment.

The device claim resource 318 may comprise a device claim data 320 (e.g., authorized user operations the device may perform on behalf of the device). The device claim resource 318 may comprise a link to claimed device 322 and a link to identity that claimed device 324. The device claim resource 318 may comprise tickets 326. The tickets 326 may comprise a device claim ticket 328. The device claim ticket 328 may be used to authenticate a device claim ticket sent by the device.

It may be appreciated that the device identification ticket 308, the user identification ticket 316, and/or the device claim ticket 328 may be a link or URL to the actual location of the ticket.

Figure 4:
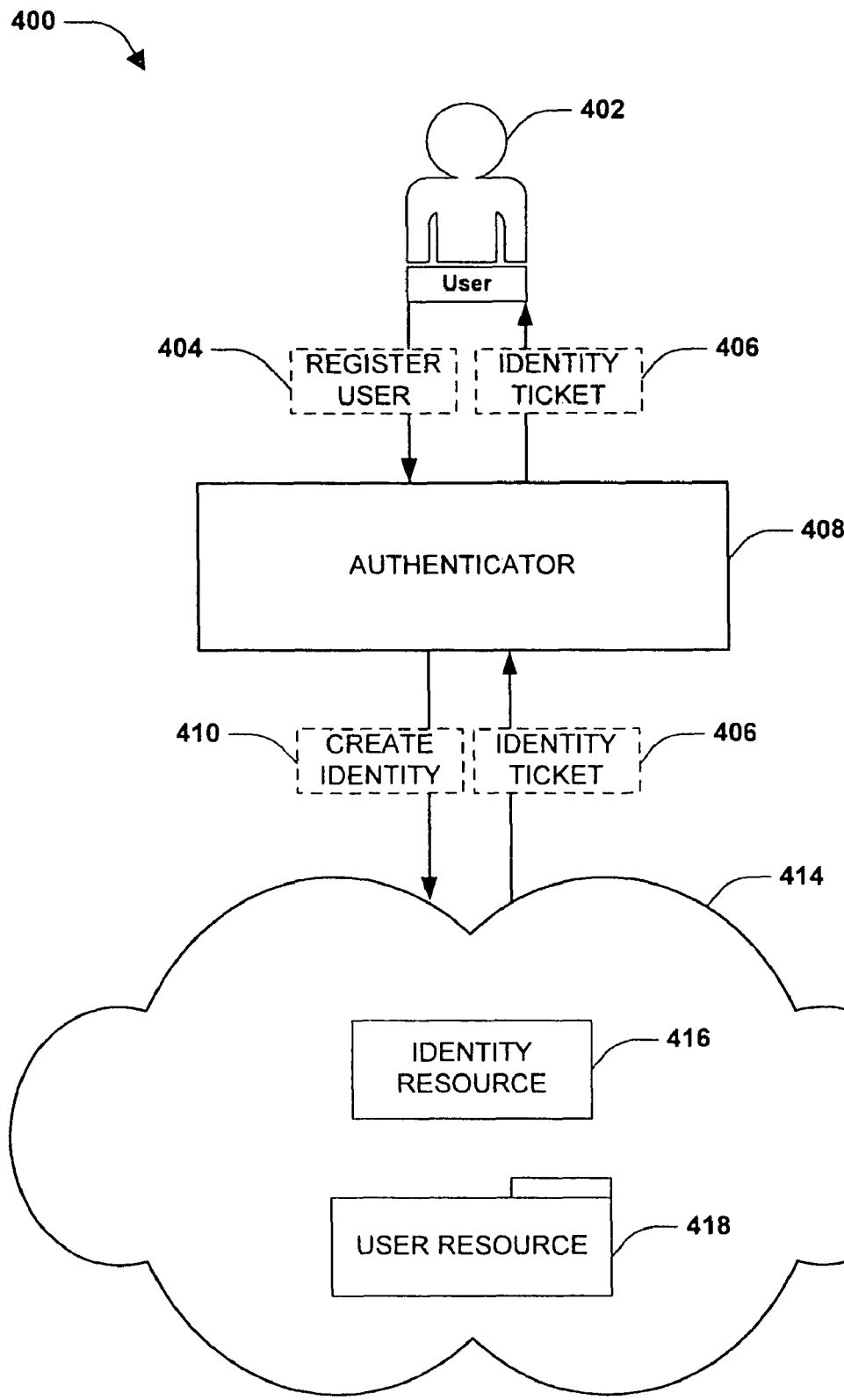
FIG. 4 is an illustration of an example of authenticating a user and creating a representation of the user within a deployable computing environment.

FIG. 4 illustrates an example 400 of authenticating a user and creating a representation of the user within a deployable computing environment. A request 404 from a user 402 to register the user 402 may be received from an authenticator 408. The request 404 may comprise identification information (e.g., a user identification token) that may be used by the authenticator 408 to authenticate the user. Upon the authenticator 408 authenticating the user 402 to interact within a deployable computing environment 414, the authenticator 408 creates 410 (e.g., sends a message to the deployable computing environment 414 to create a representation of the user 402) an identity resource 416 (e.g., identity resource 310 of FIG. 3). The identity resource 416 is a representation of the user 402 within the deployable computing environment 414. The deployable computing environment 414 may comprise a user resource 418 that represents data owned by the user 402 and/or devices owned by the user 402.

Once the identity resource 416 is created, a user identification ticket 406 is sent to the user 402. The user identification ticket 406 may be used by the user 402 for authentication purposes. For example, the user 402 may subsequently send the user identification ticket 406 to the authenticator 408 for authentication. Once authenticated, the user 402 may perform user operations within the deployable computing environment 414.

If authentication of the user identification ticket 406 fails, a request may be sent to the user for user identification information (e.g., user identification token). Authentication may fail for various reasons; one reason may be that the user identification ticket 406 has expired. Once the user 402 is authenticated based upon the user identification information, a new user identification ticket is issued to the user 402.

Figure 5:
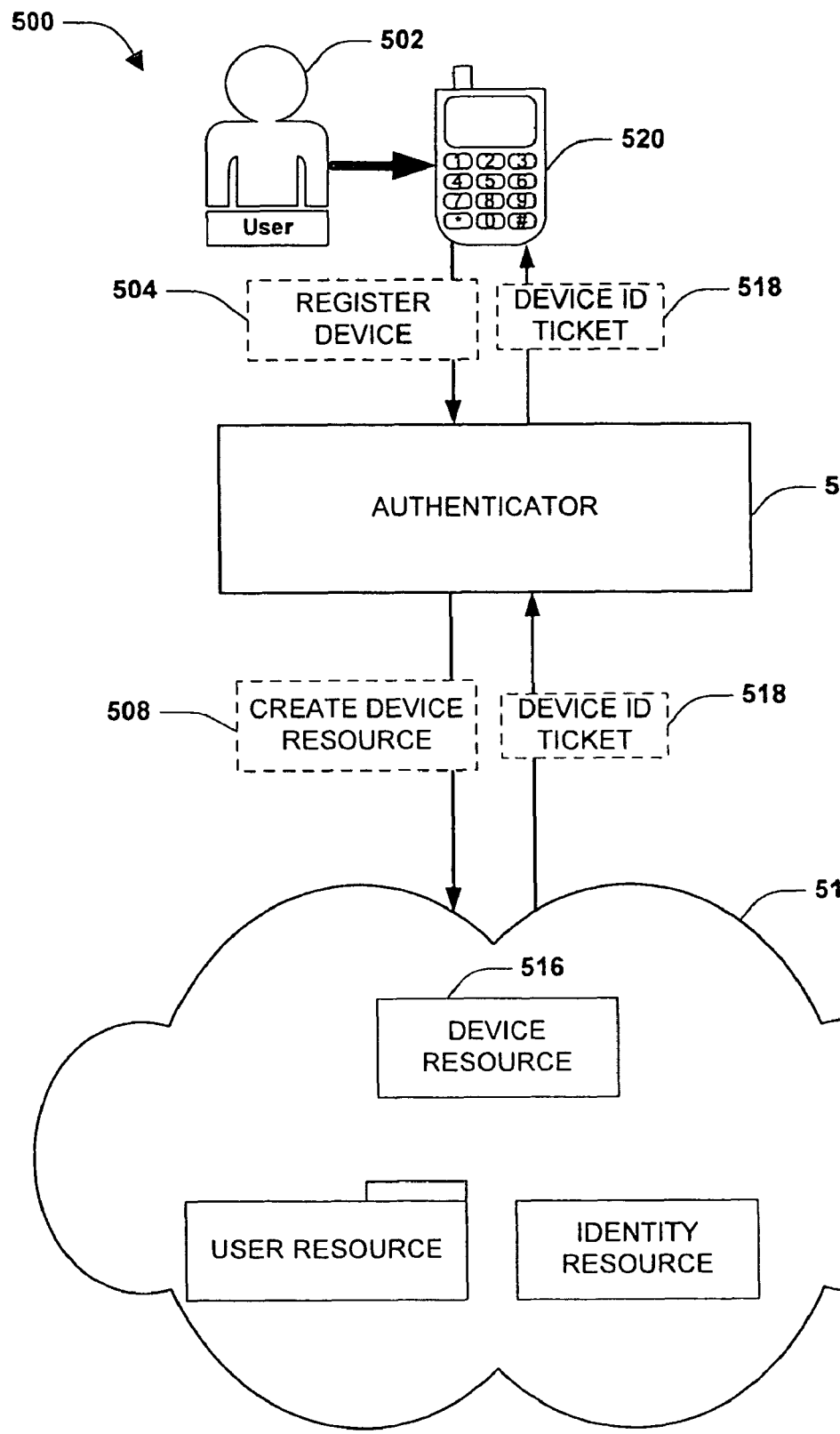
FIG. 5 is an illustration of an example of creating a representation of a device within a deployable computing environment.

FIG. 5 illustrates an example 500 of creating a representation of a device within a deployable computing environment. A request 504 to register a device 520 may be received by an authenticator 506. The request may comprise a user identification ticket and/or other information related to the device 520. The authenticator 506 authenticates the user identification ticket. Upon authentication of the user identification ticket, the authenticator 506 creates (e.g., sends a message to the deployable computing environment 510 to create a representation of the device 520) a device resource 516 within the deployable computing environment 510. The device resource 516 (e.g., device resource 302 of FIG. 3) is a representation of the device 520 within the deployable computing environment 510.

Once the device resource 516 is created, a device identification ticket 518 is sent to the device 520. The device 520 may subsequently use the device identification ticket 518 for authentication purposes. For example, the device 520 may send the device identification ticket 518 to the authenticator 506 for authentication. Upon authenticating the device identification ticket 518, the device 520 may interact within the deployable computing environment 510 (e.g., perform authorized device operations). Authorized device operations may comprise synchronizing with a resource within the deployable computing environment; subscribing to a resource owned by another device; receiving notifications of updates to a subscribed resource; etc.

Figure 6:
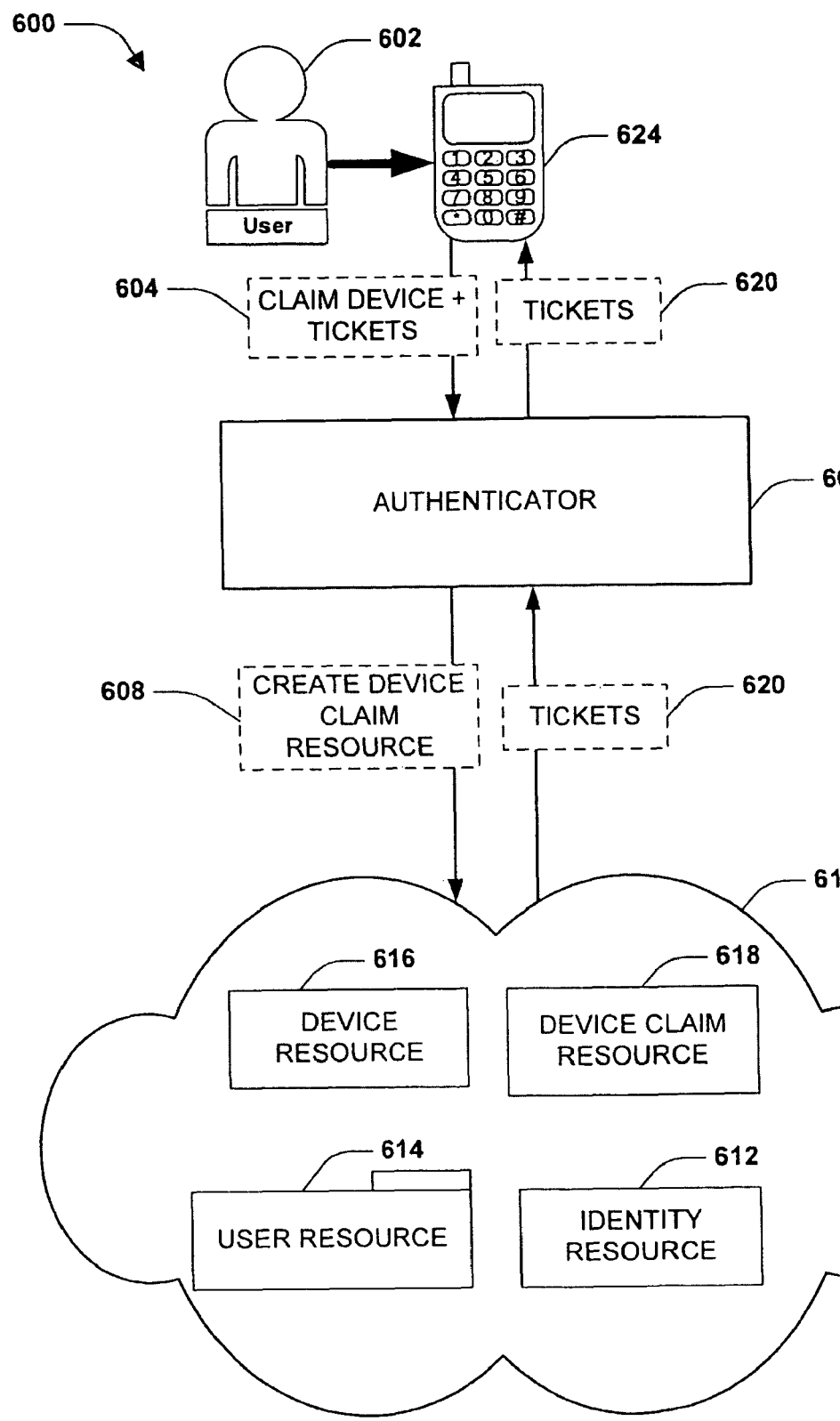
FIG. 6 is an illustration of an example of creating a representation of a relationship between a device and a user within a deployable computing environment.

FIG. 6 illustrates an example 600 of creating a representation of a relationship between a device and a user within a deployable computing environment. A request 604 from a user 602 to claim a device 624 may be received by an authenticator 606. The request 604 may comprise a user identification ticket and/or a device identification ticket. The authenticator 606 authenticates the user identification ticket and/or the device authentication ticket. Upon authentication of the user identification ticket and the device authentication ticket, the authenticator 606 creates (e.g., sends a message to the deployable computing environment 610 to create a representation of the relationship of the device 624 and the user 602) a device claim resource 618 within the deployable computing environment 610.

The device claim resource 618 (e.g., device claim resource 318 of FIG. 3) may represent the relationship between the user 602 and the device 624. For example, the device claim resource 618 indicates that the user 602 owns the device 624 and that the device 624 may perform authorized user operations on behalf of the user 602 without the need for authenticating the user 602. The device claim resource 618 may specify which other devices and user resources (e.g., user data within the deployable computing environment) that the device 624 may access and/or perform operations upon.

Once the device claim resource 618 is created, tickets 620 may be sent to the device 624. The tickets 620 may comprise a device claim ticket and/or a device identification ticket. The device identification ticket may be used by the device for authentication purposes. The device claim ticket may be used by the device to perform operations (e.g., authorized user operations) within the deployable computing environment 610 on behalf of the user 602 without the need for the user 602 to authenticate the device 624 with the user's credentials (e.g., user identification ticket).

Figure 7:
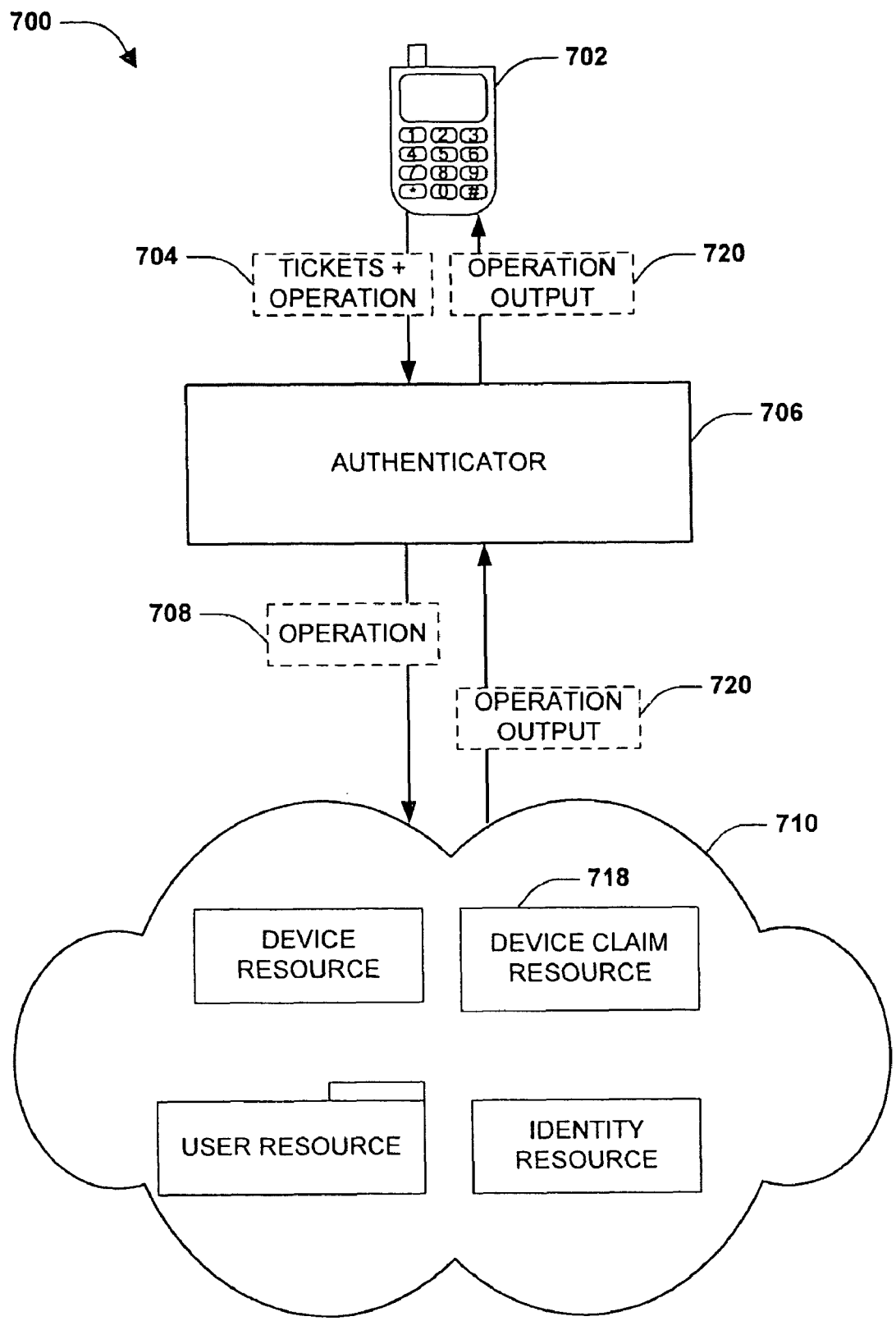
FIG. 7 is an illustration of a device performing an operation within a deployable computing environment on behalf of a user.

FIG. 7 illustrates an example 700 of a device performing an operation within a deployable computing environment on behalf of a user. An authenticator 706 receives a request 704 from a device 702. The request 704 may comprise an operation (e.g., an authorized user operation) to be performed on behalf of a user. The request 704 may comprise a device identification ticket and/or a device claim ticket. The authenticator 706 authenticates the device 702 based upon the device identification ticket. Once the device identification ticket is authenticated, the device 702 is able to interact within the deployable computing environment 710. The authenticator 706 may also authenticate the device claim ticket to determine whether the device 702 may perform operations on behalf of the user.

Once the device claim ticket and the device identification ticket are authenticated, a verification may be made as to whether the device 702 has permission delegated by the user to perform the operation 708. For example, a device claim resource 718 may comprise information regarding the rights (e.g., authorized user operations that the device 702 may perform on behalf of the user without the user's credentials) delegated by the user to the device 702. If the device 702 has permission to perform the operation 708, then the operation 708 is performed and an operation output 720 may be sent to the device 702.

Figure 8:
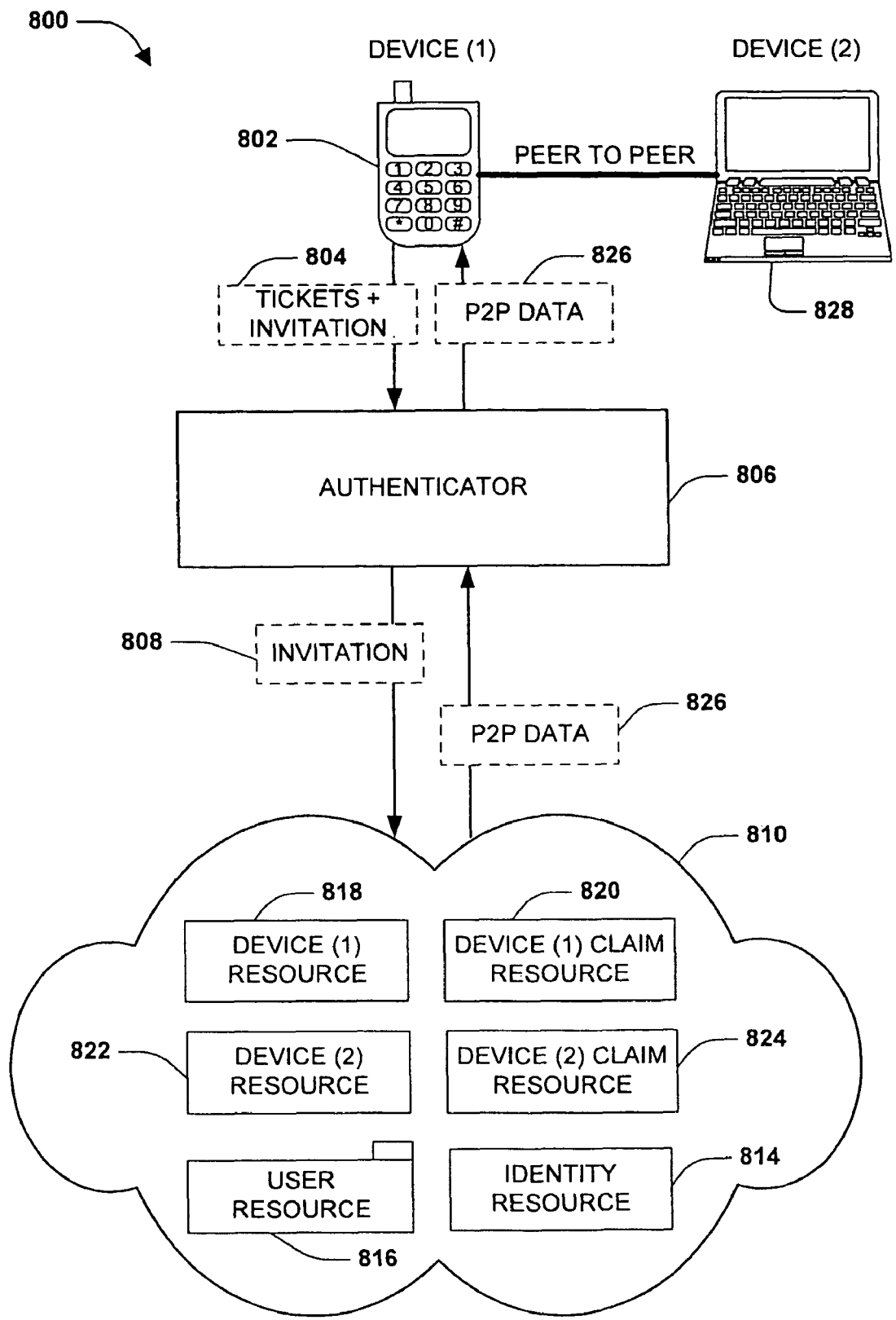
FIG. 8 is an illustration of a device performing a peer to peer connection with another device based upon user delegated rights.

FIG. 8 illustrates an example 800 of a device performing a peer to peer connection with another device based upon user delegated rights. A request 804 is received from a device (1) 802 by an authenticator 806. The request 804 may comprise a device identification ticket, a device claim ticket, and an invitation (e.g., an authorized user operation) for a peer to peer connection with a device (2) 828.

The device (1) 802 is represented within a deployable computing environment 810 as a device (1) resource 818. The relationship of device (1) 802 with a user owning device (1) 802 is represented as device (1) claim resource 820. The device (2) 828 is represented within a deployable computing environment 810 as a device (2) resource 822. The relationship of device (2) 828 with the user (e.g., the owner of device (1) 802) owning device (2) 802 is represented as device (2) claim resource 824. The identity resource 814 is the representation of the user within the deployable computing environment 810. The user resource 816 (e.g., a core object) is a representation of user data associated with the deployable computing environment 810.

The authenticator 806 authenticates the device identification ticket, allowing the device (1) 802 to interact within the deployable computing environment 810. The authenticator 806 authenticates the device claim ticket, allowing the device (1) 802 to perform operations (e.g., perform an invitation 808 for a peer to peer connection with the device (2) 828 owned by the user) on behalf of the user. A verification may be performed to determine whether the device (1) 802 has been delegated permission to perform the invitation 808 on behalf of the user. Upon verifying permission, the invitation is performed and a peer to peer data 826 (e.g., a device connection ticket) is issued to device (1) 802. Device (1) 802 may create a peer to peer connection with device (2) 828 based upon the peer to peer data 826.

In another example, a device to device authorization token may be received by the authenticator 806 from either device (1) 802 and/or device (2) 828. The device to device authorization token may be used to authenticate a relationship between device (1) 802 and device (2) 828. Once the device to device authorization token is authenticated (e.g., a relationship is determined), a peer to peer connection may be established between device (1) 802 and device (2) 828.

Figure 9:
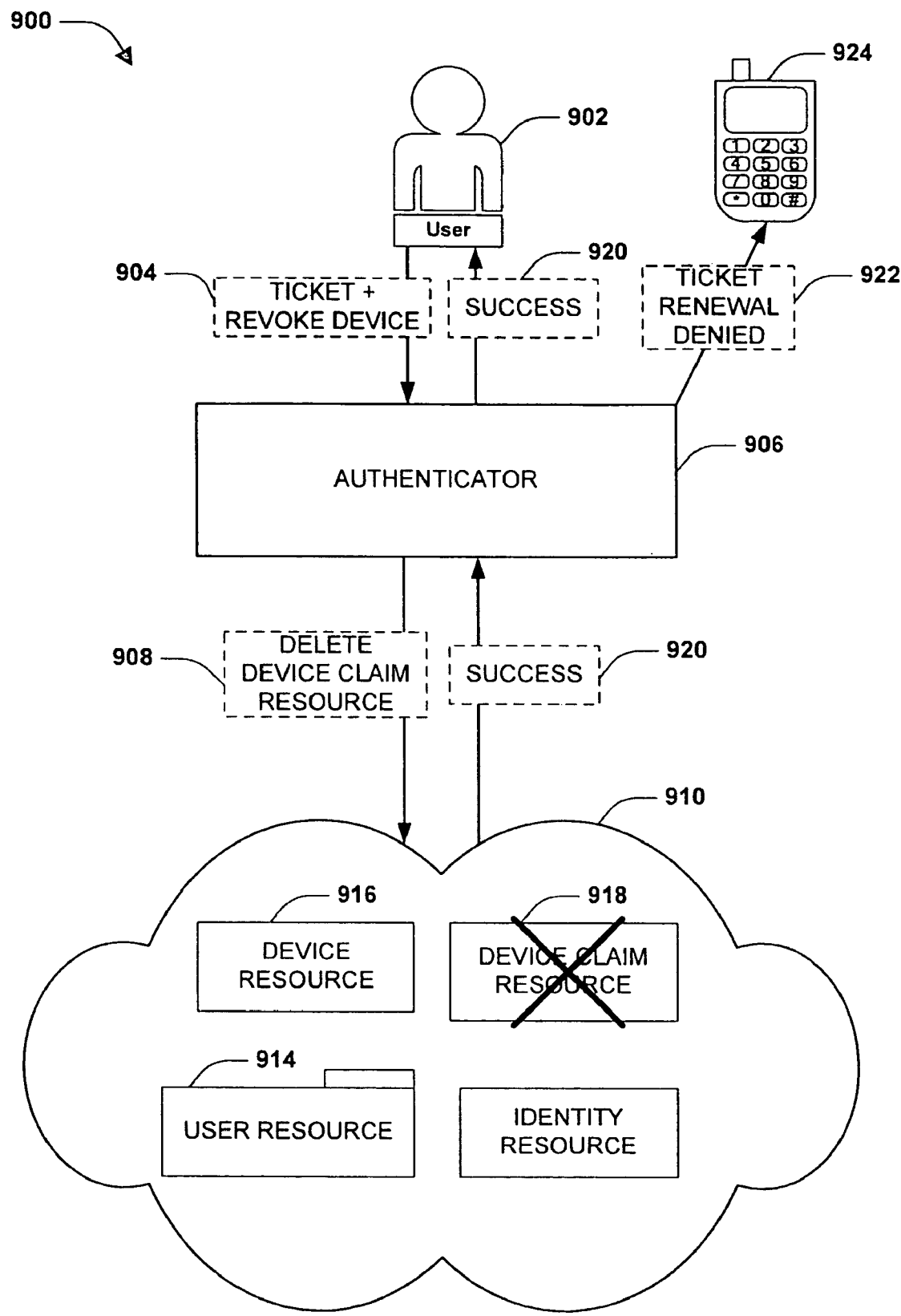
FIG. 9 is an illustration of a user terminating a relationship of the user and a device.

FIG. 9 illustrates an example 900 of a user terminating a relationship of the user and a device. A request 904 to revoke a device 924 may be received by an authenticator 906. The request 904 may comprise a user identification ticket and/or a device claim ticket. The authenticator 906 receives the request 904 and authenticates the user identification ticket. The authenticator 906 may authenticate the device claim ticket. Upon authentication, the authenticator 906 may determine whether a user 902 has a relationship (e.g., a device claim resource 918) with the device 924 that is to be revoked.

If a relationship exists between the user 902 and the device 924, then the authenticator 906 may perform a delete device claim resource operation 908 to cancel the relationship between the device 924 and the user 902. For example, the authenticator 906 terminates the device claim resource 918. Once the relationship is canceled, a success message 920 may be sent to the user 902. Because the device claim resource 918 is terminated, the device 924 is unable to request a new device claim ticket to be issued to the device 924. If the device 924 attempts to renew the device claim ticket, the authenticator 906 may send a ticket renewal denied message 922 to the device 924.

If the device resource 916 exists within the deployable computing environment 910, then the device 924 may still be authenticated based upon a device identification ticket. The device 924 may still access and interact within the deployable computing environment 910 through authorization of the device identification ticket. But, without the device claim ticket the device 924 may not perform operations on behalf of the user 902.

Figure 10:
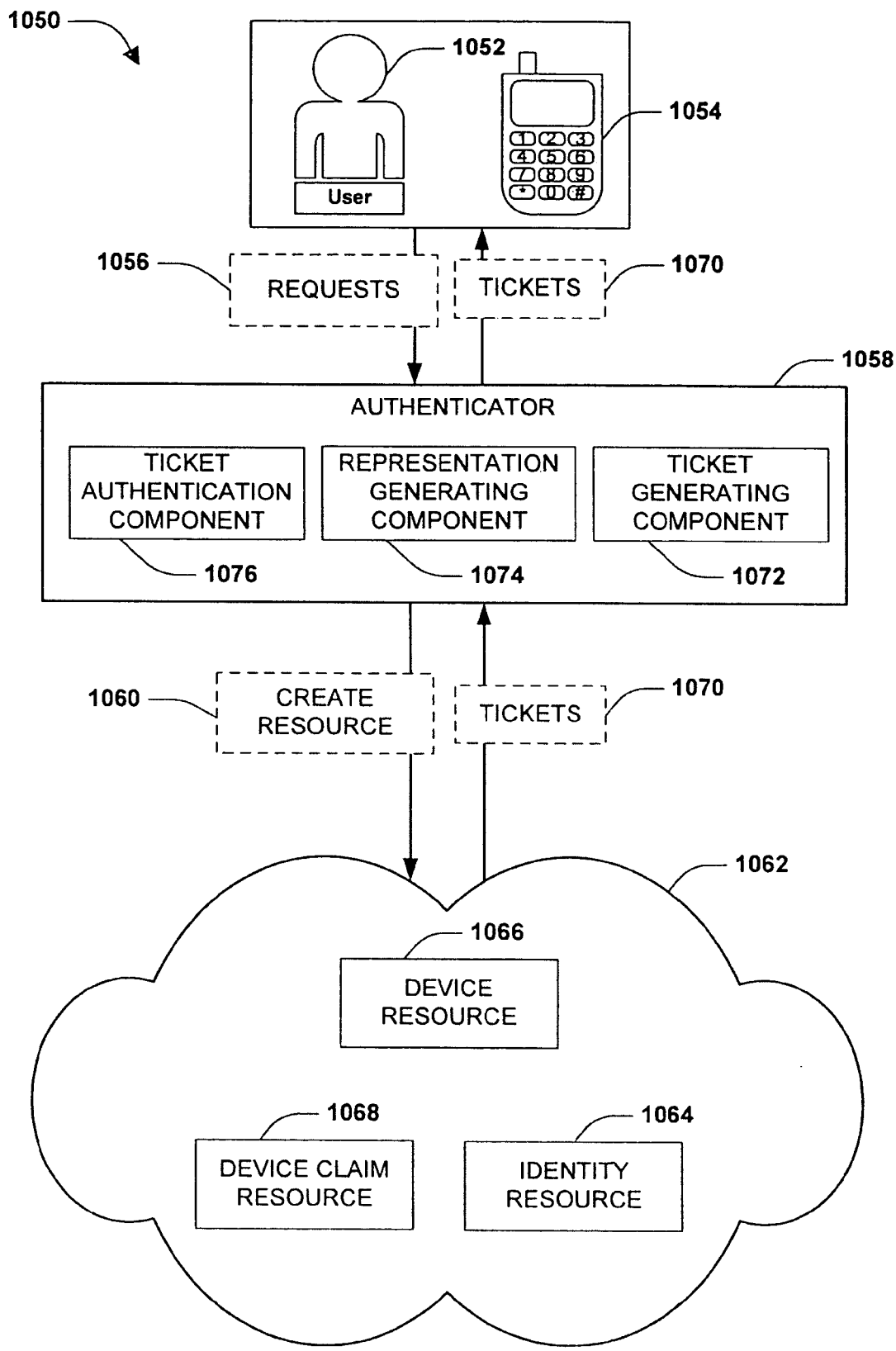
FIG. 10 is a component block diagram illustrating an exemplary system for representing and authenticating a relationship between a device and a user within a deployable computing environment.

FIG. 10 illustrates an example 1050 of a system for representing and authenticating a relationship between a device and a user within a deployable computing environment. The system comprises an authenticator 1058. The authenticator comprises a ticket authentication component 1076, a representation generating component 1074, and a ticket generating component 1072.

The representation component 1074 is configured to create a representation of a device 1054, a user 1052, and/or a relationship between the device 1054 and the user 1052. For example, a request 1056 may be received from the user 1052 to register within a deployable computing environment 1062. The representation component 1074 performs an operation 1060 to create a resource (e.g., an identity resource 1064) representing the user 1052 within the deployable computing environment 1062. In another example, the representation component 1074 may create a device resource 1066 within the deployable computing environment 1062 to represent the device 1054. In a further example, the representation component 1074 may create a device claim resource 1068 within the deployable computing environment 1062 to represent the relationship between the user 1052 and the device 1054. The relationship may describe that the user 1052 owns the device 1054 and that the user 1052 delegated rights to the device 1054 to perform operation within the deployable computing environment 1062 on behalf of the user 1052.

The ticket generating component 1072 is configured to generate and issue a ticket to the user 1052 and/or the device 1054. Once the user 1052 and/or the device 1054 are authenticated (e.g., authorized to access the deployable computing environment 1062), the ticket generating component 1072 may determine if a corresponding ticket is allocated for the user 1052 and/or device 1054. The corresponding ticket and/or a location to retrieve the corresponding ticket may be located within the deployable computing environment 1062 (e.g., within a resource). If corresponding ticket is allocated, a message 1070 is sent to the user 1052 and/or device 1054 with the ticket and/or location of the ticket. For example, a user identification ticket may be generated and issued to the user 1052, a device identification ticket may be generated and issued to the device 1054, and/or a device claim ticket may be generated and issued to the device 1054 to use on behalf of the user 1052.

The ticket authentication component 1076 is configured to receive and authenticate a ticket. For example, the user 1052 may send a user identification ticket to the ticket authentication component 1076. The ticket authentication component 1076 may authenticate the user identification ticket by determining if the user identification ticket correlates to ticket information stored within the identity resource 1064 representing the user 1052. If the user identification ticket is authenticated, then the user 1052 is able to access and interact within the deployable computing environment 1062. In another example, the ticket authentication component 1076 may receive and identify a device identification ticket from a device 1054. If the device identification ticket is authenticated, then the device 1054 may access and interact within the deployable computing environment 1062.

In a further example, the ticket authentication component 1076 may receive the device identification ticket and a device claim ticket. The ticket authentication component 1076 may authenticate the device identification ticket so the device 1054 may access the deployable computing environment 1062. The ticket authentication component 1076 may authenticate the device claim ticket so the device 1054 may perform delegated operations (e.g., authorized user operations) within the deployable computing environment 1062 on behalf of the user 1052 without the user's credentials (e.g., user identification ticket).

Providing a representation of a device, a user, and a relationship between the device and the user within a deployable computing environment allows for secure authentication of the user and/or device. A device identification ticket, a user identification ticket, and a device claim ticket are used to authenticate and establish what rights the user and/or device may have when interacting within the deployable computing environment. With the device claim ticket, the device may perform operations (e.g., operations delegated by the user) on behalf of the user. This enables peer connectivity, data synchronization, digital media licensing, etc.

Figure 11:
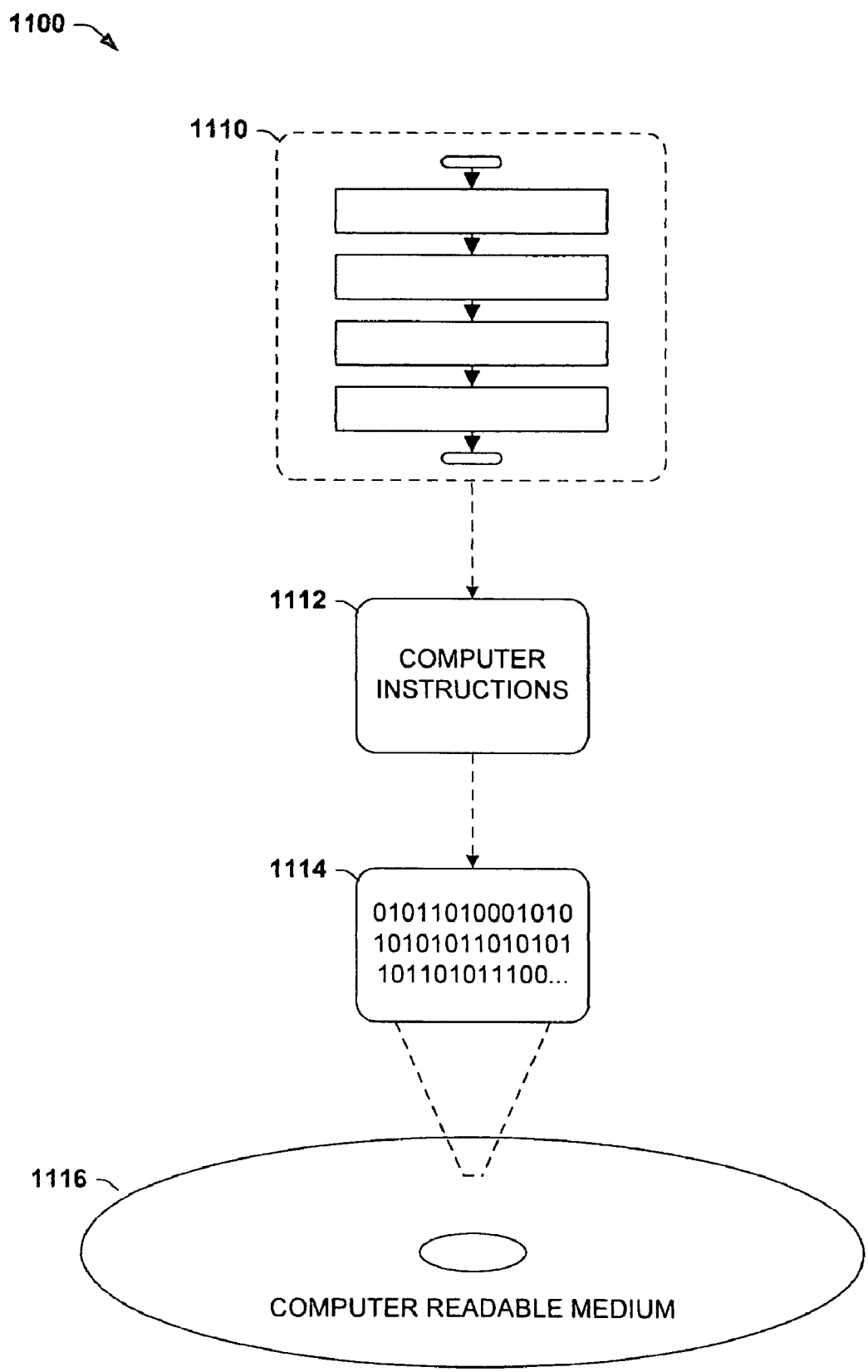
FIG. 11 is an illustration of an exemplary computer-readable medium comprising processor-executable instructions configured to embody one or more of the provisions set forth herein.

Still another embodiment involves a computer-readable medium comprising processor-executable instructions configured to implement one or more of the techniques presented herein. An exemplary computer-readable medium that may be devised in these ways is illustrated in FIG. 11, wherein the implementation 1100 comprises a computer-readable medium 1116 (e.g., a CD-R, DVD-R, or a platter of a hard disk drive), on which is encoded computer-readable data 1110. This computer-readable data 1110 in turn comprises a set of computer instructions 1112 configured to operate according to one or more of the principles set forth herein. In one such embodiment 1100, the processor-executable instructions 1114 may be configured to perform a method, such as the exemplary method 100 of FIG. 1 and/or exemplary method 200 of FIG. 2, for example. In another such embodiment, the processor-executable instructions 1114 may be configured to implement a system, such as the exemplary system 1050 of FIG. 10, for example. Many such computer-readable media may be devised by those of ordinary skill in the art that are configured to operate in accordance with the techniques presented herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used in this application, the terms "component," "module," "system", "interface", and the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, those skilled in the art will recognize many modifications may be made to this configuration Without departing from the scope or spirit of the claimed subject matter.

Figure 12:
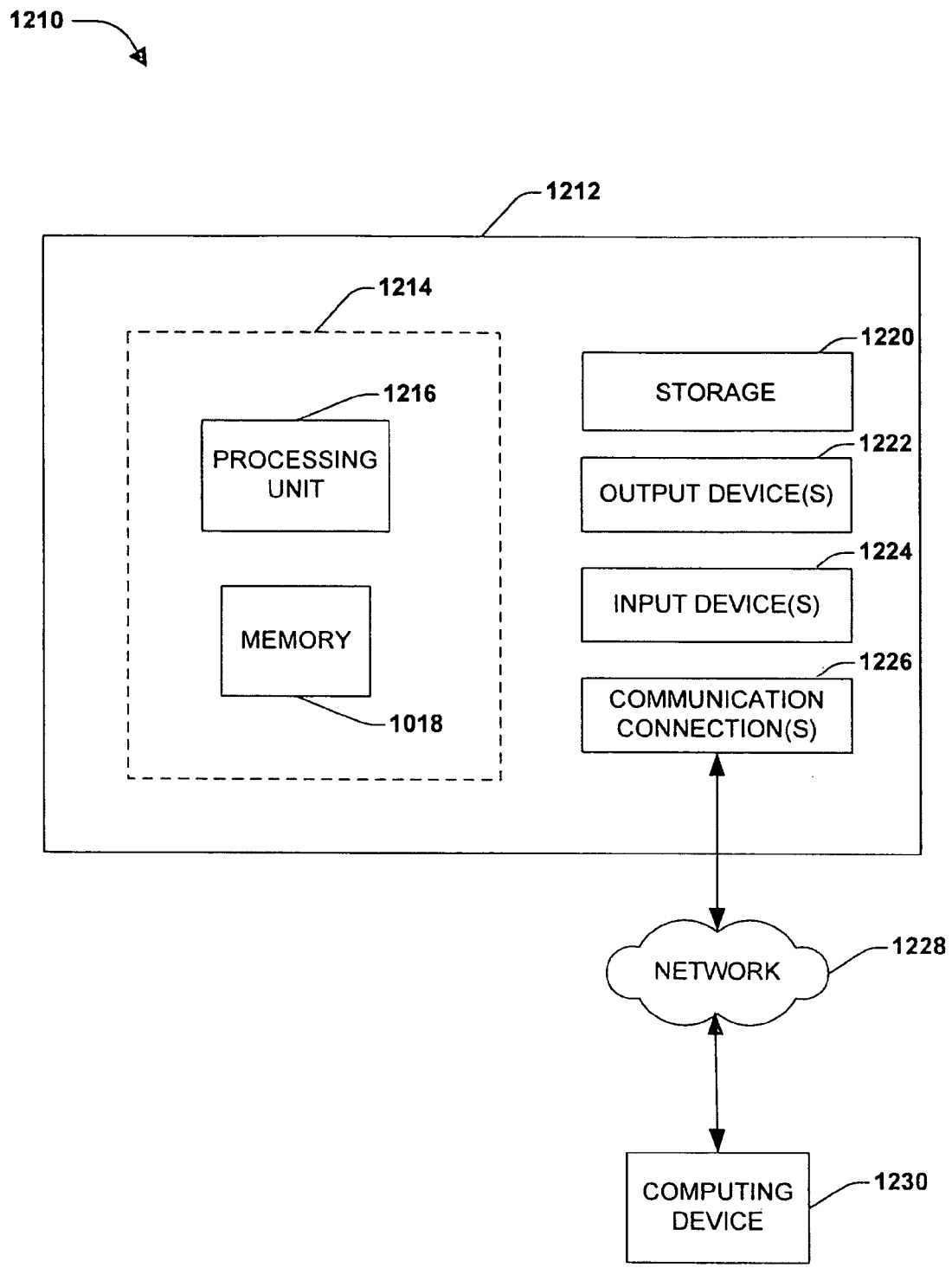
FIG. 12 illustrates an exemplary computing environment wherein one or more of the provisions set forth herein may be implemented.

FIG. 12 and the following discussion provide a brief, general description of a suitable computing environment to implement embodiments of one or more of the provisions set forth herein. The operating environment of FIG. 12 is only one example of a suitable operating environment and is not intended to suggest any limitation as to the scope of use or functionality of the operating environment. Example computing devices include, but are not limited to, personal computers, server computers, hand-held or laptop devices, mobile devices (such as mobile phones, Personal Digital Assistants (PDAs), media players, and the like), multiprocessor systems, consumer electronics, mini computers, mainframe computers, distributed computing environments that include any of the above systems or devices, and the like.

Although not required, embodiments are described in the general context of "computer readable instructions" being executed by one or more computing devices. Computer readable instructions may be distributed via computer readable media (discussed below). Computer readable instructions may be implemented as program modules, such as functions, objects, Application Programming Interfaces (APIs), data structures, and the like, that perform particular tasks or implement particular abstract data types. Typically, the functionality of the computer readable instructions may be combined or distributed as desired in various environments.

FIG. 12 illustrates an example of a system 1210 comprising a computing device 1212 configured to implement one or more embodiments provided herein. In one configuration, computing device 1212 includes at least one processing unit 1216 and memory 1218. Depending on the exact configuration and type of computing device, memory 1218 may be volatile (such as RAM, for example), non-volatile (such as ROM, flash memory, etc., for example) or some combination of the two. This configuration is illustrated in FIG. 12 by dashed line 1214.

In other embodiments device 1212 may include additional features and/or functionality. For example, device 1212 may also include additional storage (e.g., removable and/or non-removable) including, but not limited to, magnetic storage, optical storage, and the like. Such additional storage is illustrated in FIG. 12 by storage 1220. In one embodiment, computer readable instructions to implement one or more embodiments provided herein may be in storage 1220. Storage 1220 may also store other computer readable instructions to implement an operating system, an application program, and the like. Computer readable instructions may be loaded in memory 1218 for execution by processing unit 1216, for example.

The term "computer readable media" as used herein includes computer storage media. Computer storage media includes volatile and nonvolatile, removable and non-removable media implemented in any method or technology for storage of information such as computer readable instructions or other data. Memory 1218 and storage 1220 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information and which can be accessed by device 1212. Any such computer storage media may be part of device 1212.

Device 1212 may also include communication connection(s) 1226 that allows device 1212 to communicate with other devices. Communication connection(s) 1226 may include, but is not limited to, a modem, a Network Interface Card (NIC), an integrated network interface, a radio frequency transmitter/receiver, an infrared port, a USB connection, or other interfaces for connecting computing device 1212 to other computing devices. Communication connection(s) 1226 may include a wired connection or a wireless connection. Communication connection(s) 1226 may transmit and/or receive communication media.

The term "computer readable media" may include communication media. Communication media typically embodies computer readable instructions or other data in a "modulated data signal" such as a carrier wave or other transport mechanism and includes any information delivery media. The term "modulated data signal" may include a signal that has one or more of its characteristics set or changed in such a manner as to encode information in the signal.

Device 1212 may include input device(s) 1224 such as keyboard, mouse, pen, voice input device, touch input device, infrared cameras, video input devices, and/or any other input device. Output device(s) 1222 such as one or more displays, speakers, printers, and/or any other output device may also be included in device 1212. Input device(s) 1224 and output device(s) 1222 may be connected to device 1212 via a wired connection, wireless connection, or any combination thereof. In one embodiment, an input device or an output device from another computing device may be used as input device(s) 1224 or output device(s) 1222 for computing device 1212.

Components of computing device 1212 may be connected by various interconnects, such as a bus. Such interconnects may include a Peripheral Component Interconnect (PCI), such as PCI Express, a Universal Serial Bus (USB), firewire (IEEE 1394), an optical bus structure, and the like. In another embodiment, components of computing device 1212 may be interconnected by a network. For example, memory 1218 may be comprised of multiple physical memory units located in different physical locations interconnected by a network.

Those skilled in the art will realize that storage devices utilized to store computer readable instructions may be distributed across a network. For example, a computing device 1230 accessible via network 1228 may store computer readable instructions to implement one or more embodiments provided herein. Computing device 1212 may access computing device 1230 and download a part or all of the computer readable instructions for execution. Alternatively, computing device 1212 may download pieces of the computer readable instructions, as needed, or some instructions may be executed at computing device 1212 and some at computing device 1230.

Various operations of embodiments are provided herein. In one embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein.

Moreover, the word "exemplary" is used herein to mean serving as an example, instance, or illustration. Any aspect or design described herein as "exemplary" is not necessarily to be construed as advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims may generally be construed to mean "one or more" unless specified otherwise or clear from context to be directed to a singular form.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure. In addition, while a particular feature of the disclosure may have been disclosed with respect to only one of several implementations, such feature may be combined with one or more other features of the other implementations as may be desired and advantageous for any given or particular application. Furthermore, to the extent that the terms "includes", "having", "has", "with", or variants thereof are used in either the detailed description or the claims, such terms are intended to be inclusive in a manner similar to the term "comprising."

What is claimed is:

1. A method for managing relationships in a deployable computing environment, comprising:

creating an identity resource representing a user within a deployable computing environment, the identity resource corresponding to a user identification ticket used to authorize the user to perform one or more user operations;

creating a device resource representing a device within the deployable computing environment, the device resource corresponding to a device identification ticket used to authorize the device to perform one or more device operations; and creating a device claim resource representing a relationship between the user and the device, the device claim resource corresponding to a device claim ticket used to authorize the device to perform an authorized user operation on behalf of the user regardless of whether the user has authorized user operation via the user identification ticket, the authorized user operation not comprising the one or more device operations that the device is authorized to perform, at least some of at least one of the creating an identity resource, the creating a device resource, or the creating a device claim resource implemented at least in part via a processing unit.

2. The method of claim 1, comprising
receiving the user identification ticket from the user on a first device; and
authorizing the user to perform a user operation based upon authentication of the user identification ticket.

3. The method of claim 1, comprising:
receiving the device identification ticket from the device; and
authorizing the device to perform a device operation based upon authentication of the device identification ticket.

4. The method of claim 3, comprising:
restricting the device from performing a user operation on behalf of the user based upon the user not authorizing user operation via the user identification ticket.

5. The method of claim 1, comprising:
receiving the device claim ticket from the device; and
authorizing the device to perform the authorized user operation on behalf of the user based upon authentication of the device claim ticket.

6. The method of claim 5, the authorizing comprising:
authorizing the device to perform the authorized user operation on behalf of the user when the user has not obtained authorization through the device using the user identification ticket.

7. The method of claim 1, comprising:
terminating the device claim resource to restrict the device from performing the authorized user operation on behalf of the user.

8. The method of claim 1, the authorized user operation comprising at least one of a user resource enumeration, a user property modification, or a user resource modification.

9. The method of claim 1, a device operation comprising a resource synchronization operation between a resource within the device and a corresponding resource within the deployable computing environment.

10. The method of claim 1, comprising:
receiving the device claim ticket from the device; and
authorizing the device to access a second device on behalf of the user as the authorized user operation based upon authentication of the device claim ticket, the second device having a relationship with the user that is represented by a second device claim resource within the deployable computing environment.

11. A system for managing relationships in a deployable computing environment, comprising:
an authenticator component configured to:
create an identity resource representing a user within a deployable computing environment, the identity resource corresponding to a user identification ticket used to authorize the user to perform one or more user operations;
create a device resource representing a device within the deployable computing environment, the device resource corresponding to a device identification ticket used to authorize the device to perform one or more device operations; and
create a device claim resource representing a relationship between the user and the device, the device claim resource corresponding to a device claim ticket used to authorize the device to perform an authorized user operation on behalf of the user regardless of whether the user has authorized user operation via the user identification ticket, the authorized user operation not comprising the one or more device operations that the device is authorized to perform,
at least some of the authenticator component implemented at least in part via a processing unit.

12. The system of claim 11, the authenticator component configured to:
receive the device claim ticket from the device; and
authorize the device to perform the authorized user operation on behalf of the user based upon authentication of the device claim ticket.

13. The system of claim 11, the authenticator component configured to:
receive the device claim ticket from the device; and
authorize the device to access a second device on behalf of the user as the authorized user operation based upon authentication of the device claim ticket, the second device having a relationship with the user that is represented by a second device claim resource within the deployable computing environment.

14. The system of claim 11, the authenticator component configured to:
receive the user identification ticket from the user on a first device; and
authorize the user to perform a user operation based upon authentication of the user identification ticket.

15. The system of claim 12, the authenticator component configured to:
authorize the device to perform the authorized user operation on behalf of the user when the user has not obtained authorization through the device using the user identification ticket.

16. The system of claim 11, the authenticator component configured:
terminate the device claim resource to restrict the device from performing the authorized user operation on behalf of the user.

17. A tangible computer-readable storage medium comprising computer-executable instructions, which when executed at least in part via a processing unit on a computer performs acts, comprising:
creating an identity resource representing a user within a deployable computing environment, the identity resource corresponding to a user identification ticket used to authorize the user to perform one or more user operations;
creating a device resource representing a device within the deployable computing environment, the device resource corresponding to a device identification ticket used to authorize the device to perform one or more device operations; and
creating a device claim resource representing a relationship between the user and the device, the device claim resource corresponding to a device claim ticket used to authorize the device to perform an authorized user operation on behalf of the user regardless of whether the user has authorized user operation via the user identification ticket, the authorized user operation not comprising the one or more device operations that the device is authorized to perform.

18. The tangible computer-readable storage medium of claim 17, comprising:
   receiving the device claim ticket from the device; and
   authorizing the device to perform the authorized user operation on behalf of the user based upon authentication of the device claim ticket.

19. The tangible computer-readable storage medium of claim 18, comprising:
   authorizing the device to perform the authorized user operation on behalf of the user when the user has not obtained authorization through the device using the user identification ticket.

20. The tangible computer-readable storage medium of claim 17, comprising:
   receiving the device claim ticket from the device; and
   authorizing the device to access a second device on behalf of the user as the authorized user operation based upon authentication of the device claim ticket, the second device having a relationship with the user that is represented by a second device claim resource within the deployable computing environment.

* * * * *